United States Patent [19]
Hankammer

[11] 3,747,767
[45] July 24, 1973

[54] WATER TREATMENT DEVICE
[75] Inventor: Heinz Hankammer, Wiesbaden-Sonnenberg, Germany
[73] Assignee: Chemie Brita Geraete Ing. Itter, Wiesbaden, Germany
[22] Filed: Apr. 29, 1971
[21] Appl. No.: 138,628

[30] Foreign Application Priority Data
May 13, 1970 Germany................. P 70 17 889.1

[52] U.S. Cl.................. 210/282, 210/289, 210/477
[51] Int. Cl............................................. B01d 27/02
[58] Field of Search.................. 210/282, 289, 477, 210/479, 480, 482, 498, 499

[56] References Cited
UNITED STATES PATENTS
| | | | |
|---|---|---|---|
| 1,774,004 | 8/1930 | Haslett | 210/282 X |
| 2,772,002 | 11/1956 | Mauro | 210/289 X |
| 3,625,652 | 12/1971 | Fujimoto et al. | 210/282 |
| 3,534,856 | 10/1970 | Marsh | 210/498 X |

FOREIGN PATENTS OR APPLICATIONS
| | | | |
|---|---|---|---|
| 9,573 | 1906 | Great Britain | 210/282 |
| 493,539 | 1/1937 | Great Britain | 210/282 |
| 4,286 | 1883 | Great Britain | 210/498 |

*Primary Examiner*—Samih N. Zaharna
*Attorney*—Toren & McGeady

[57] ABSTRACT

A water treatment device is formed of a funnel-shaped part and an elongated tubular-shaped shell having one end fitted into the funnel-shaped part. The shell in combination with a screen-like closure at each end forms a chamber which contains a granular cleaning agent not soluble in water. The screen-like closures are formed to provide openings for the water but to prevent any passage of the granular material. The funnel-shaped part is more elastic than the shell and deforms when the shell is inserted into it so that a seal-type engagement is provided between the two. Removable covers can be provided for the opposite ends of the shell.

5 Claims, 3 Drawing Figures

INVENTOR
HEINZ HANKAMMER
BY Toren and McGeady
ATTORNEYS

WATER TREATMENT DEVICE

SUMMARY OF THE INVENTION

The present invention is directed to a device for water treatment by means of a granular cleaning agent and, more particularly, it is specifically directed to the structure of the device containing the granular cleaning agent.

Examples of granular cleaning agents not soluble in water and useful in water treatment are adsorbing cleaning agents such as ion exchangers or activated charcoal. The ion exchangers are useful for the demineralization of water, such as is intended for use in batteries, steam irons and similar purposes where water free of ions is required. Household water, such as is used for making tea or coffee, can be dechlorinated by means of activated charcoal.

It is the primary object of the present invention to provide a water treatment device which has universal applicability, particularly for use in the home and smaller commercial enterprises, and one which is suitable for the alternating uses of different water treatment agents, such as for demineralization at one time and dechlorination at another time.

Therefore, in accordance with the present invention, a water treatment device consists of a funnel-shaped part and of a shell which is detachably connected to the funnel-shaped part and has a screen-like closure at each of its ends which retain a granular cleaning agent, not soluble in water, within the shell while permitting the flow of water through the shell.

In this water treatment device, the shell containing the granular cleaning agent is readily exchangeable so that a shell containing ion exchangers for the demineralization of water can be used at one time and then replaced with another shell containing activated charcoal for the dechlorination of water. Further, besides the universal applicability of this device, a shell with fresh cleaning agent can be kept handy for replacing a used shell when it becomes apparent that the useful life of the cleaning agent is finished.

For economic reasons it is expedient to produce the device from plastic material. In a preferred embodiment of the invention, the funnel-shaped part is formed of a plastic material which is more elastic than the shell and provides an attachment section with an inwardly extending circular flange against which the shell seats. At its end which fits within the attachment section, the shell has an outwardly directed circular flange which can be pushed into the attachment section so that the flange of the shell forms a circular sealing surface against the inside wall of the attachment section. Further, the flange on the attachment section fits tightly against the outer surface of the shell at its end so that a liquid-tight joint is provided between the two. Accordingly, a tight fit of the shell within the attachment section of the funnel-shaped part is provided with the further advantage of a double-seal which prevents untreated water from bypassing the shell. Moreover, by pushing the shell firmly into the funnel-shaped part it can be easily seated in position for use and, further, it can be readily removed when it is no longer being used.

As can be appreciated, the detachable connection between the shell and the funnel-shaped part can be accomplished in other ways, such as by means of a screw thread or by a bayonet lock, however, with such connections it is necessary, as a rule, to place sealing means, such as sealing rings, in the connection, which are not required in the preferred embodiment descirbed above.

Shells filled with the granular cleaning agent can be marketed as individual replacement items for the water treatment device and the screen-like closures can be integrally attached to each end of the shell. However, it is expedient for economic reasons to be able to remove the cleaning agent, such as an ion exchanger or activated charcoal, from the shell after the completion of its useful life and to replace it with a new or regenerated cleaning agent. Where the granular cleaning agent is to be replaced, the screen-like closure in the end of the shell located within the funnel-shaped part is made removable while at the other end the screen-like closure is formed as an integral part of the shell. The expression "screen-like" means any structure formed so that the granular cleaning agent is retained within the chamber formed within the shell while water can flow into and out of the chamber in the shell through the closure. Accordingly, the screen-like closures can be formed in a variety of ways, such as perforated plates, slotted plates, screens and the like can be used.

When plastic material is used in forming the shell and its screen-like closures, it is often difficult from a manufacturing point of view to provide the screen-like closures with openings of the desired size. Therefore, it is preferred in constructing the screen-like closures to use concentrically arranged ribs arranged in two planes, one superposed on the other, and with the ribs in the planes staggered relatively to one another so that arcuate slots of a width narrower than the thickness of the granular cleaning agent are provided between the adjacent edges of the ribs. Such ribbed screen-like closures can be molded by using two mold halves having webs which contact each other at the edges and which form the grooves between the ribs of the screen-like closures. Since the edges of the webs of the two mold halves touch each other, then the narrow slots are formed in the screen-like closures between the ribs in the adjacent planes.

Although the ribs in the screen-like closures may be arranged in a random manner, it is preferable if they are arranged in concentric rings, reinforced by radially extending ribs. Moreover, for production reasons it is also preferable if the cross-section of the ribs forming the screen-like closure taper outwardly from the common center plane to the outwardly spaced surfaces of the ribs.

It is particularly important when ion exchangers are used as the granular cleaning agent, that care be exercised to maintain the cleaning agent moist when it is not in use. For this reason, the shell must be provided with a cover for the screen-like closures at each end to assure that the shell is water-tight. It is considered advisable if the shell covers have an identical configuration to simplify production and also to be able, in the event one of the covers becomes lost, to use the remaining cover for the lower end even though it may have been the cover for the lower end which was lost. When using identical covers, they are provided with a circular clamping ring whose inside and outside diameter is dimensioned so that the cover can be clamped inside the upper end of the shell or over the outside of the lower end of the shell. From this arrangment of the covers it can be appreciated that the shell tapers inwardly from its upper to its lower end.

The various features of novelty which characterize the invention are pointed out with particularlity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE INVENTION

Figure 1:
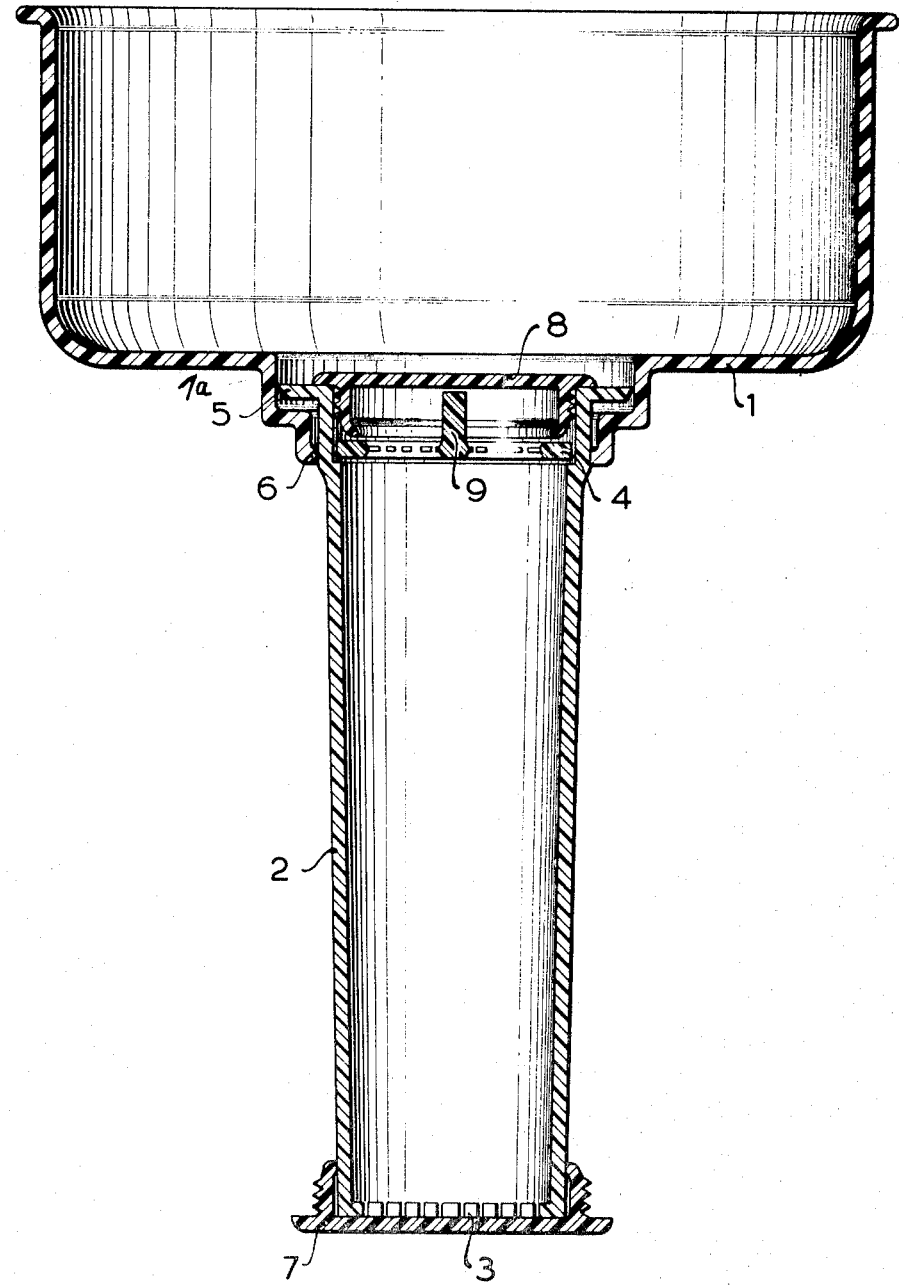
FIG. 1 is a vertical sectional view of a water treatment device in accordance with the present invention.

As shown in FIG. 1, a water treatment device consists of a funnel-shaped part 1 into which a shell 2 is fitted. Centrally located in the lower surface of the funnel-shaped part 1 is a tubular attachment section 1a within which the upper end of the shell seats. At its lower end the attachment section has an inwardly directed flange 6 which has an inverted L-shape. One leg of the L-shaped flange extends inwardly from the upper part of the attachment section and the other leg extends downwardly in the direction of the shell from the inner end of the inwardly directed leg. An elongated tubular shell 2 is insertable into the funnel-shaped part 1 from the top through its attachment section 1a. As can be seen in FIG. 1, the body of the shell 2 tapers or converges inwardly from its upper to its lower end. At its upper end, the shell has an outwardly directed circular flange 5 which is dimensioned so that it can be pushed or forced into the upper part of the attachment section 1a of the funnel-shaped part 1.

In forming the funnel-shaped part 1 and the shell 2, the shell is made of a stiffer material than that of the funnel-shaped part and when the shell is inserted into the funnel-shaped part, due to the difference in stiffnesses of the material, it can be firmly seated within the attachment section 1a without causing any irreversible deformation of the funnel-shaped part 1. Additionally, the flange 6 on the lower end of the attachment section 1a is dimensioned so that its downwardly depending leg rests in sealing engagement against the outer surface of the shell 2. Accordingly, when the shell is inserted into the attachment section of the funnel-shaped part, a pair of annular shaped sealing areas are provided, one between the flange 5 and the inside surface of the upper part of the attachment section 1a and the other between the lower leg of the flange 6 and the outside surface of the shell 2.

In the embodiment shown in FIG. 1, a lower screen-like closure is formed as an integral part of the shell 2 while at its opposite upper end a removable screen-like closure 4 having a centrally arranged handle 9 is provided. The handle 9 aids in removing the upper screen-like closure 4.

In the arrangement shown in FIG. 1, removable covers 7, 8 are provided for each of the lower and upper ends of the shell, respectively. As illustrated, the lower cover 7 fits over the outside of the lower end of the shell while the upper cover 8 seats within the flange 5 about the upper end of the shell. Both of the covers are shaped to provide a water-tight engagement with the ends of the shell.

Figure 2:
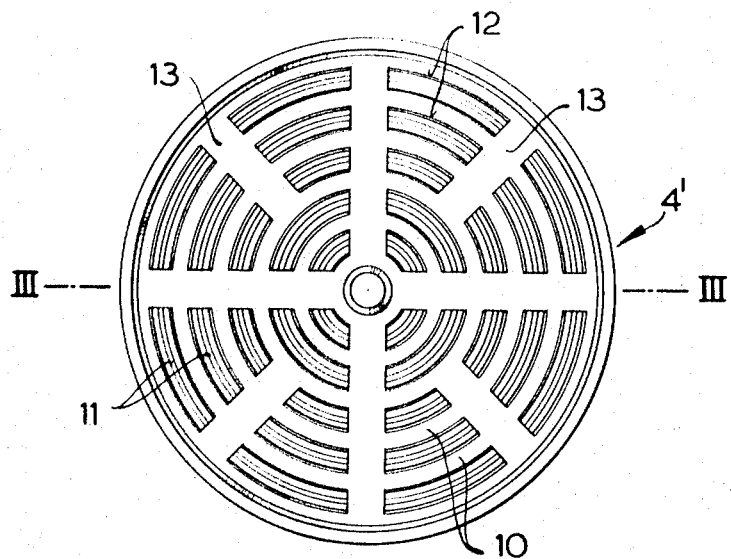
FIG. 2 is a plan view, on an enlarged scale, of a preferred embodiment of an upper screen-like closure for the device shown in FIG. 1.
Figure 3:
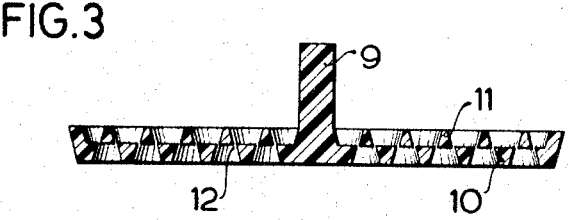
FIG. 3 is a cross-sectional view of the screen-like closure shown in FIG. 2, taken along line III—III.

Within the shell 2 between its lower and upper screen-like closures 3, 4 a chamber is formed for granular cleaning agents (not shown in the drawing) which are not soluble in water, such as activated charcoal or ion exchangers. When several different ion exchangers are used within the chamber in the shell at the same time, such as a cation exchanger and an anion exchanger, they can be accommodated within the shell, one layer above the other, separated by a water permeable screen. In FIGS. 2 and 3 a preferred embodiment of an upper screen-like closure 4' is illustrated and, as shown clearly in FIG. 3, the screen-like arrangement is formed by a plurality of concentrically arranged ribs 10, 11 with the ribs 11 superposed in a plane above the ribs 10 so that the upper surface of the ribs 10 and the lower surface of the ribs 11 are in substantially the same plane. Further, the ribs are offset or staggered relative to one another in the radial direction so that at the adjoining edges of the ribs 10 and 11 in the common plane between them a narrow spacing is provided forming arcuately shaped slots 12. The upper screen-like closure 4' includes the handle 9 so that the closure can be removed from the shell when it is desired to do so. Moreover, to reinforce the closure and to interconnect its lower and upper ribs 10, 11, a plurality of radially extending angularly spaced ribs 13 are provided.

In general, the lower screen-like closure 3 is formed in a manner similar to the upper screen-like closure 4', except that the lower closure forms an integral part of the shell since it is molded directly to it.

While a specific embodiment of the invention has been shown and described in detail to illustrate the application of the inventive principles, it will be understood that the invention may be embodied otherwise without departing from such principles.

What is claimed is:

1. A device for water treatment, comprising a tubular shell, a screen-like closure for each of the opposite ends of said shell, said shell and closures forming a chamber arranged to contain a granular agent for treating water, said closures being formed so that the openings there-through are of a size to prevent any displacement of the granular agent from the chamber while permitting passage of water through said closures, said screen-like closures are molded integrally of a plastic material and each comprises a number of ribs in the form of concentric rings disposed in a first plane and another number of ribs in the form of concentric rings disposed in a second plane parallel to and superimposed on the first plane of said ribs so that the lower surface of said ribs in said second plane and the upper surface of said ribs in said first plane are in substantially the same plane, first radially extending ribs located in said first plane interconnecting said concentric ribs in said first plane and second radially extending ribs located in said second plane interconnecting said concentric ribs in said second plane, said concentric ribs in said first plane have a slightly different radius from the adjacent said concentric ribs in said second plane and are offset laterally relative to said concentric ribs in said second plane so that the adjacent lower edges of said concentric ribs in said second plane and the upper edges of said concentric ribs in said first plane are spaced apart for forming narrow arcuate slots having a width less than the size of the granular agent so that water can pass through the arcuate slots while the granular cleaning agent is retained within the chamber in said shell.

2. A device, as set forth in claim 1, characterized in that said screen-like closure on one end of said shell being removably secured within said shell, and the other said screen-like closure at the opposite end of said shell being formed as an integral part of said shell.

3. A device, as set forth in claim 2, characterized in that a handle is formed on the removable said screen-like closure for assisting in removing said closure from said shell.

4. A device, as set forth in claim 3, characterized in that said screen-like closure within the one end of said shell is inset into said shell, a pair of identically shaped covers having an annular shaped clamping rim extending therefrom being arranged to form covers for the opposite ends of said shell, said covers being dimensioned so that one of them can be inserted with its rim extending within said shell into the one end thereof while the other said cover is fitted over the opposite end of said shell so that its rim fits about the outer surface of said shell.

5. A device, as set forth in claim 4, characterized in that the walls of said shell tapering inwardly from the one end thereof to the other end.

* * * * *